Aug. 29, 1967  L. P. HUNTER  3,339,073
SONIC LASER MODULATOR WITH MODES SUPPRESSION
PRODUCED BY EXTERNAL MODULATION
Filed Dec. 31, 1962  2 Sheets-Sheet 1

INVENTOR
LLOYD P. HUNTER

BY *Joseph C. Redmond, Jr.*

ATTORNEY

Aug. 29, 1967　　　　　　　　L. P. HUNTER　　　　　　　3,339,073
SONIC LASER MODULATOR WITH MODES SUPPRESSION
PRODUCED BY EXTERNAL MODULATION
Filed Dec. 31, 1962

United States Patent Office 3,339,073
Patented Aug. 29, 1967

3,339,073
SONIC LASER MODULATOR WITH MODE
SUPPRESSION PRODUCED BY EXTERNAL MODULATION
Lloyd P. Hunter, Palo Alto, Calif., assignor to International Business Machines Corporation, New York, N.Y., a corporation of New York
Filed Dec. 31, 1962, Ser. No. 248,609
7 Claims. (Cl. 250—199)

This invention relates to optical lasers and, more particularly, to modulating apparatus for such systems.

Since the filing of U.S. patent applications Ser. Nos. 73,878, now Patent No. 3,130,254, issued April 21, 1964, and 75,296, now Patent No. 3,229,221, issued January 11, 1966, entitled, "Optical Lasers," filed Dec. 5, 1960, and Dec. 12, 1960, respectively, and assigned to the same assignee as that of the present invention, considerable attention has been directed toward the use of such apparatus in information handling systems. Such systems comprise essentially a coherent light generator, modulating apparatus and a detector. The modulation and detection apparatus should be simple in construction, reliable in operation and suitable for fabrication with presently available commercial apparatus. It is desirable, therefore, to provide optical laser information handling apparatus that satisfy these requirements.

An object of the invention is a frequency-modulated laser.

Another object is a laser that is internally frequency modulated.

Another object is a high mode selective laser that is sonically modulated.

Still another object is frequency-modulated detection apparatus responsive to coherent radiation in the visible or infrared region of the electromagnetic wave spectrum.

These and other objects are accomplished in accordance with the present invention, one illustrative embodiment of which comprises a laser cavity and a reflecting surface external to the cavity. The laser cavity is essentially a Fabry-Perot resonator which has been shown and described in application Ser. Nos. 73,878 and 75,296, previously indicated. Briefly, the resonator or interferometer is an active element, typically a ruby crystal, built with a suitable impurity and arranged for optical oscillation in response to a pumping signal. A reflective coating is applied to each end of the crystal, one end having a small amount of transmissivity to electromagnetic waves in the optical region of the spectrum. Optical radiation passing through the one end is directed onto the external reflector which is arranged to return the radiation to the crystal. When the external reflector is spaced a preselected distance from the crystal, discrimination occurs among the various oscillation modes occurring in the crystal. Mechanically vibrating the external mirror produces a frequency shift in the selected modes of the crystal, the frequency shift being proportional to the displacement of the reflector with respect to a reference. Typically, but not exclusively, the reflector can be mounted on an electromechanical transducer, i.e., a magnetostrictive element or a piezoelectric crystal. Alternatively, one surface of the crystal can be adapted to have a mirror surface. Such a crystal, when subjected to a suitable oscillating voltage, will develop a resonant mirror vibration that originates a periodic frequency modulation in the selective modes emitted by the crystal. An amplitude modulation can be superimposed on the oscillating signal applied to the crystal. Alternatively, the crystal can be operated in a forced non-resonant mode in which case the crystal may be driven directly by the information signal without amplitude modulation. Accordingly, the maximum displacement of the vibrating reflector, with respect to the reference, is proportional to the amplitude-modulated signal or information signal, as the case may be. In any event, however, the selected modes appearing at the output of the crystal are frequency shifted an amount corresponding to the displacement of the crystal. The output of the laser cavity, as a result, is a periodically frequency-modulated version of the amplitude-modulated signal applied to the piezoelectric crystal. The frequency-modulated radiation can be demodulated at a photodetector when a heterodyne signal developed by a second laser cavity is supplied to the detector. The difference between the heterodyne oscillator frequency and the signal laser operates the photodetector at a point below the detector cut-off output frequency to provide an electrical signal corresponding to the frequency-modulated signal developed at the signal laser. The electrical frequency signal can be supplied to a conventional FM receiver for translation purposes.

A feature of the invention is a laser cavity and an external reflector suitably positioned along a central axis whereby the application of pumping power to the laser and the mechanical vibration of the reflector provides a laser output having a preselected frequency bandwidth.

Another feature is a laser cavity and an external reflector, the latter being secured to a piezoelectric crystal adapted to be driven by a source of oscillating power whereby the crystal is operated in a non-resonant mode, the application of a source of pumping power to the laser and an amplitude-modulated signal to the crystal producing a laser output at a preselected carrier frequency that may be frequency modulated in accordance with the amplitude-modulated signal.

Another feature is a laser cavity and an external reflector, the laser cavity receiving a source of input power and developing an oscillating mode within the cavity which is transmitted to the reflector and returned to establish a preselected signal mode in the cavity whereby oscillating the reflector at a preselected frequency develops frequency shifts which may be employed in a frequency-modulated information handling system.

Still another feature is a laser cavity and an external reflector secured to a piezoelectric crystal adapted to be driven by a source of oscillating power, a heterodyne laser oscillator and a photodetector whereby an amplitude-modulated signal applied to the source of oscillating power will develop frequency shifts in preselected modes occurring in the laser cavity, such frequency shifts being included in a laser output that is directed to the photodetector which provides an electrical output corresponding to the frequency shift when a second laser output is directed on to the detector as a heterodyne signal.

Still another feature is a laser cavity and an external reflector, the latter being operated in a resonant mode by a source of oscillating power that is amplitude modulated whereby the laser cavity is internally frequency modulated on a selective mode basis when a source of pumping power is directed to the cavity thereby to provide a frequency modulated output signal in the visible or infrared region of the electromagnetic wave spectrum in accordance with the amplitude-modulated signal.

The foregoing and other objects, features and advantages of the invention will be apparent from the following more particular description of preferred embodiments of the invention, as illustrated in the accompanying drawings.

Figure 1:
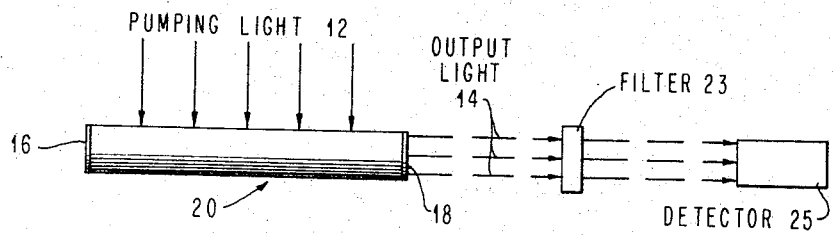
FIGURE 1 is a schematic diagram of an optical maser used as a generator.

FIGURE 1 is an embodiment of a conventional optical maser used as a generator of electromagnetic waves. In this figure, 20 generally designates the optical maser cavity to which input pumping light, represented by arrows 12, is applied to produce an output, represented by arrows 14, which is both coherent and monochromatic. The cavity 20 is cylindrical in shape and is provided at opposite ends with reflective surfaces 16 and 18. Each of these surfaces is made to reflect some 98.5% of the light incident thereon, and to transmit approximately 1.5% of the incident light. Where the device is to be used solely as a generator, reflecting surface 16 is completely opaque.

The cavity 20 may be formed of a crystal, such as ruby, as taught by the prior art. See for example, IBM Journal of Research and Development, volume 5, page 56, 1961, "Solid-State Optical Maser Using Divalent Samarium in Calcium Fluoride." The article relates to solid-state lasers, that is, lasers which have as their active element a crystal containing a suitable doping material wherein electromagnetic oscillations are produced. It should be understood that the active element of a solid-state laser is sometimes referred to as the cavity or resonator of the laser. The earliest known solid-state laser is the so-called "ruby laser" which has an active element fabricated of aluminum oxide doped with chromium. The ruby laser produces an output radiation which is in the red area of the visible portion of the electromagnetic wave spectrum. It should also be noted that laser cavities using a tubular container containing a vapor have also the characteristics required to produce the optical laser effect.

Figure 2:
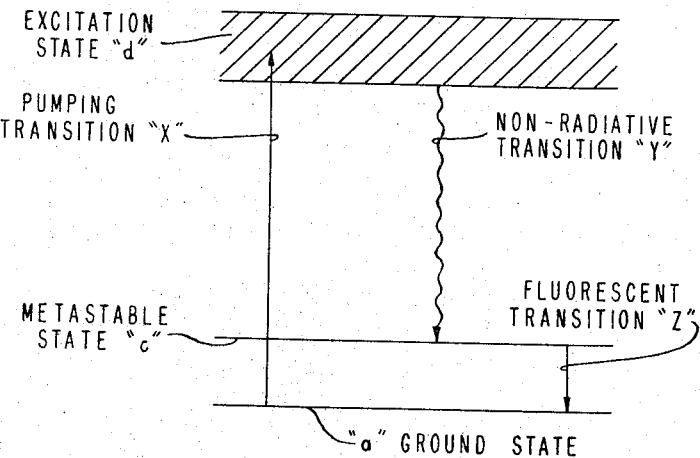
FIGURE 2 is an energy-level diagram indicating the transitions which occur to produce optical maser operation in a material wherein the stimulated transition terminates in the ground or lowest energy state for the ion in the material.

The chromium atoms present in the active element of the ruby laser, which provide the stimulated emission, have three different energy states, that is, a ground state "a," a metastable state "c" and an excitation state "d," as indicated in FIGURE 2. Lasers, however, may also be operated in a four state mechanism. The fourth state operates as a terminating state. The present invention has application to such devices, but for purposes of description, the three state laser will be described.

When radiation energy is applied to one or more surfaces of the active elements of the laser, the chromium atoms, as indicated in FIGURE 2, are pumped from the ground state to the excitation state. When the maser material is in the quiescent state, that is, in the absence of pumping, essentially all of the ions in the material are in the ground state.

When the pumping input, represented by arrows 12 in FIGURE 1, is applied, certain of these atoms undergo a pumping transition, illustrated in FIGURE 2, by the arrow X, to the excitation band "d." In order for this transition to occur, the pumping light applied as an input must include light at the frequency necessary to pump ions from ground state "a" to the excitation band "d." This frequency is determined by the absorption characteristic of the maser material and it is preferable if this frequency is in the visible portion of the electromagnetic wave spectrum. During this pumping operation, the energy is absorbed in the maser material. The ions, once they are pumped into the excitation band "d," undergo a non-radiative transition, represented by arrow Y to a metastable state "c." By non-radiative, it is meant that during this transition, no fluorescence is produced but rather, the energy associated with the transition is dissipated in the lattice vibrations within the crystalline material. The ions in the metastable state "c," after this non-radiative transition, then go through a fluorescent transition, represented by the arrow Z, back to the ground state "a." During this transition, a light output is produced at a frequency determined by the fluorescent characteristic of the maser material. For example, the energy level diagram of FIGURE 2, in which the fluorescent transition terminates in the ground state "a," is the type of transition utilized in ruby masers of the prior art which produce outputs at a wavelength of about 6940 angstroms.

As long as the input pumping light is maintained below a predetermined threshold, the number of ions pumped to the excitation state "d" which then undergo a non-radiative transition Y back to state "c" and finally, a fluorescent transition Z back to the ground state, is too small to produce stimulated emission in the crystal and oscillation in the cavity. The output produced by the material under these conditions is referred to as spontaneous emission.

When, however, the pumping light input is increased to an intensity above a predetermined threshold, sufficient atoms are moved from the ground state "a" through excitation "d" and metastable state "c" and undergo fluorescent transitions between this state and the ground state "a" to produce stimulated emission of further ions between these two states. When this stimulated emission is sufficient to overcome losses in the cavity, oscillations between surfaces 16 and 18 build up to produce a high intensity monochromatic light output as represented by the arrows 14 in FIGURE 1. This phenomenon necessary for the optical laser effect which is referred to as stimulated emission is achieved when a sufficient population inversion is achieved between the low energy ground state "a" and the high energy metastable state "c". When the pumping input produces a sufficient amount of this stimulated emission, light at the characteristic wavelength propagating in a mode between surfaces 16 and 18 actually picks up energy as it propagates. When this occurs, oscillation in this mode occurs to build up high intensity, monochromatic coherent light in the cavity. The output from the cavities, represented by arrows 14, is applied to a filter 23 which filters all light except that at the desired frequency. The output from filter 23 is then applied to detector 25.

The minimum requirements for producing this oscillation is, as stated above, a population inversion between the states "a" and "c" sufficient to overcome losses in the cavity. The maser material in its quiescent state has practically all of its ions in its low energy or ground state "a." In order to achieve a population inversion, that is, a condition where there are more ions in the high energy state "c" than in the low energy state "a," it is necessary that the population of the ground state "a" be depleted and the population of the metastable state "c" be increased. This is accomplished by the pumping operation whereby the ions are pumped into the excitation state "d" from which they leak back in non-radiative transition to the metastable state "c." Each of these ions then undergoes a fluorescent transition from state "c" to state "a," producing a light output at a frequency characteristic of transitions between these two states. This light energy at this frequency, once produced, is available to stimulate further transition between the two states "c" and "a." These transitions may be from the ground state "a" to the metastable state "c" which is an absorption type transmission or from the metastable state "c" to the ground state "a" to produce still more fluorescence. As the population of state "c," relative to state "a," is increased by the application of the pumping energy, the probability is also increased that the further transitions from state "c" to state "a" will be further fluorescent transitions, producing more light rather than absorption transitions. When this population inversion reaches the point that the stimulated fluorescent radiation between states "c" and "a" have sufficient power to overcome any losses in wave propagation longitudinally between and at reflected surfaces 16 and 18, an oscillation occurs and conditions continue in a crystalline maser.

As stated above, each of the transitions from state "c" to state "a" is at a particular frequency determined by the material itself and, therefore, the light propagating and the maser of FIGURE 1, between surfaces 16 and 18 is at this particular frequency and is highly monochromatic. Further, since any light produced in the direction other than perpendicular to the surfaces 16 and 18 is allowed to pass through the sidewalls of the maser or crystal or is absorbed thereat, the light oscillating back and forth between these surfaces is highly coherent. In the construction shown in FIGURE 1, assuming that the surface 16 is completely opaque and the surface 18 transmits 1.5% of the incident light, this small portion of the oscillating light in the cavity passes through surface 18 to produce a highly monochromatic coherent light output, represented by the arrow 14.

Considering specifically a ruby laser operating at "$f$," a frequency approximately $4 \times 10^{14}$ cycles per second; $\mu a$. dielectric constant of 1.77 and assuming a practical length "$d$" of the crystal of two centimeters, we find that "$n$" (the number of standing half waves developed in the crystal) is given by the well-known relationship:

$$n\lambda = 2\mu d \quad (1)$$

where $\lambda$=wavelength=$c/f$
where $f$=frequency and $c$=the velocity of light Substituting into Equation 1, we obtain $$N = 0.94 \times 10^5$$

The above indicates that in a three angstroms (3 A.) spectral line width, there would be about 38 modes in the crystal spaced approximately 0.08 angstrom apart. Not all of these oscillations, however, exceed the threshold for producing a monochromatic light.

Figure 3:
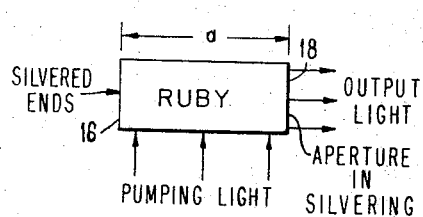
FIGURE 3 is a schematic diagram of an optical maser employing a ruby crystal as a cavity generator.
Figure 3A:
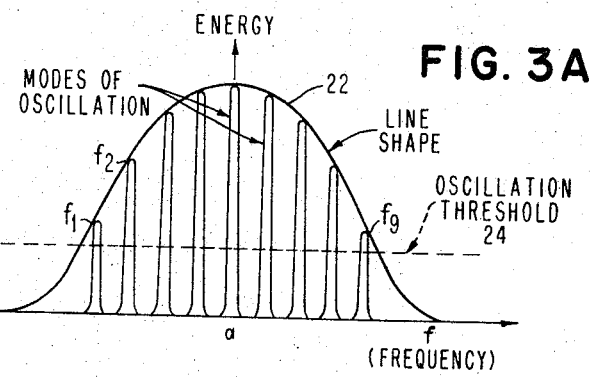
FIGURE 3A is an energy-frequency diagram of the output modes of the maser shown in FIGURE 3.

Referring to FIGURES 3 and 3A, a frequency-energy diagram is indicated for a ruby crystal of the type described in FIGURE 1. The light admitted through the aperture in the silver is represented by the frequency-energy diagram appearing in FIGURE 3A adjacent to the crystal. In this example the natural line width is considered (for purposes of illustration only) to be of the order of 1 angstrom, so that only 9 frequency modes exceed the oscillation threshold previously described and shown by the dotted line 24. The spacing between the frequencies is accentuated to indicate the individual frequencies. Some frequencies have higher amplitudes than others due to the parameters of the crystal and the pumping frequency supplied to the crystal. The coherent light spectrum, therefore, is the frequency difference between points $f_1 \ldots f_9$ where an envelope 22 touches the oscillation threshold level 24.

Figure 4:
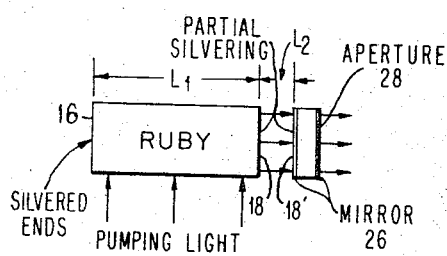
FIGURE 4 is a schematic diagram of the optical maser providing a selected mode output.

FIGURE 3A represents the normal output of the laser as presently understood in the art. The purpose of the present invention is to utilize the coherent output to transmit intelligence from one point to another. The present invention modifies the arrangement of FIGURE 3 by the addition of an externally positioned mirror 26, as indicated in FIGURE 4. The mirror is partially silvered in a manner similar to that described for the partial silvering of the crystal end 18. The mirror may also include an aperture 28 to permit the passage of the transmitted signal to a distant point for demodulation, as will be described hereinafter. The output of the crystal is reflected and returned to the crystal where the returned signal is mixed with the internal frequencies. The embodiment of FIGURE 4 can be considered to be a laser with two cavities instead of a single cavity. The surface 18 of FIGURE 4 may be represented by two plates 18 and 18'. The amplifying medium that exists in the crystal, therefore, may be assumed to be that which exists between 16 and 18 as well as that between 18 and 18'. Now the frequency at which phase coherence is maintained in the amplifying medium is dependent upon the reflectivity of the two plate reflectors 18 and 18'. The separation of the outside mirror is less than that of the laser crystal itself. The effect of the outside mirror is to accentuate some frequency and attenuate other frequencies. However, the total number of modes in the two cavity crystal is greater than that of a single cavity crystal. Assuming a 2.25 millimeter air gap to the external mirror, it will add 6000 more half waves bringing the total system to $1 \times 10^5$ half waves which adds two more modes to that previously indicated. The number of modes exceeding the oscillation threshold, however, will be reduced. A detailed and theoretical explanation for the mode accentuation and attenuation in a three reflector surface laser is given in an article appearing in the "Bell System Technical Journal," March 1962, volume 41, No. 2, pages 453 and 462.

Figure 4A:
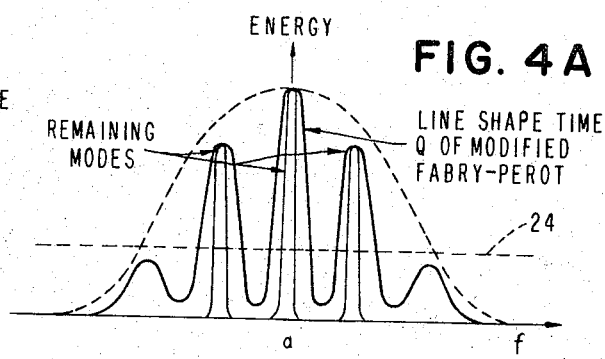
FIGURE 4A is an energy-frequency diagram of selected mode outputs of the maser shown in FIGURE 4.

Assuming an external path $L_2$ which is about one-half of the crystal path length $L_1$, it has been determined that every other frequency mode of the two cavity lasers shown in FIGURE 4 will be cancelled when the mirror spacing is as follows:

$$(L_2/L_1)n = p$$

where $n$ is the number of wavelengths in the crystal and $p$ is the number of wavelengths between the mirror and the crystal for the central frequency. The modified energy-frequency diagram, for the laser of FIGURE 4 appears as that indicated in FIGURE 4A. The central frequency remains unattenuated but all other frequencies have been attenuated. The result is that instead of nine frequency modes exceeding the oscillation threshold level, a single central frequency with two side bands exceed the oscillation threshold level. The central frequency and side bands contain all of the coherent energy output from the crystal with the result that they may be transmitted over a longer range than the embodiment of FIGURE 2. It should be noted that additional modes have been introduced into the cavity by the added path length but since these do not exceed the oscillation threshold level, it is not necessary to discuss their presence and effect. It should also be noted that although specific distances have been established for the cavity length, the present invention is not limited to those indicated. Other distances may be employed with corresponding changes in the output frequency modes. It is possible to realize a single frequency mode output by appropriate selection of cavity parameters. The present cavity distances were selected solely for reasons of explanation.

Having obtained a substantially single frequency mode output from the laser, the next step is to superimpose intelligence on the central frequency output or carrier and detect and reproduce the original information input to the laser.

Figure 5:
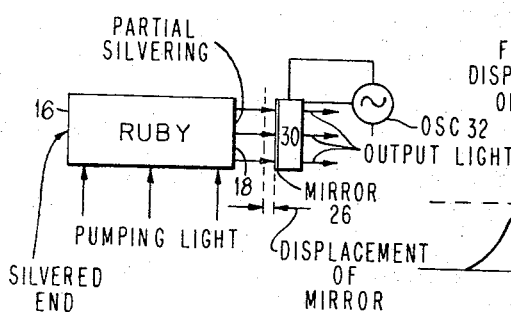
FIGURE 5 is a schematic embodiment of an internally frequency-modulated, selected mode optical maser.

Turning now to FIGURE 5, one embodiment is indicated for adapting a selective mode laser to receive information signals for transmission to a distant station. FIGURE 5 is substantially the same as FIGURE 4 except that the mirror 26 is one surface of an electromechanical transducer, i.e., a magnetostrictive element or a piezoelectric crystal 30. An oscillator or signal source is suitably connected to the crystal by techniques well-known in the art. The oscillator or signal source supplies energy to the crystal for purposes of contraction and expansion. The contraction and expansion of the crystal 30 change the path length of the cavity between reflecting surfaces 18 and 18'. The change in the cavity path length alters the frequency developed in the cavity. The effect of the change in path length on cavity frequency is given below:

$$n\lambda = 2\mu d \quad (1)$$

$$\lambda = c/f \quad (2)$$

where $f$ = cavity frequency and
$c$ = the velocity of light

Substituting for $\lambda$ and rearranging terms $$f = \frac{nc}{2\mu d} \qquad (3)$$

Differentiating frequency with respect to distance, $$\frac{\Delta f}{f} = -\frac{\Delta d}{d} \qquad (4)$$

The relationship (4) indicates that a change in length, $d$, of the laser cavity will produce a corresponding change in the laser mode frequency. The mirror change necessary to obtain a 1 kmc. frequency bandwidth can be obtained from the Formula 4. Assuming a ruby crystal receiving a pumping frequency of $4 \times 10^{14}$ cycles/second and a cavity length of 22.5 millimeters, a laser output having a frequency bandwidth of 1 kmc. can be obtained by varying the mirror position $\frac{1}{8}\lambda$. A total movement of $\frac{1}{8}\lambda$ (e.g., $\pm \frac{1}{16}\lambda$ from a central position) corresponds to a mirror position change of $\pm 4.7 \times 10^{-6}$ centimeters from a central position. A signal source can produce such a change in the piezoelectric crystal dimensions. The signal source will produce a non-resonant mode operation when directly connected to a 1 millimeter ADP crystal with 1,000 volts applied or a Rochelle salt crystal with 150 volts applied.

Figure 5A:
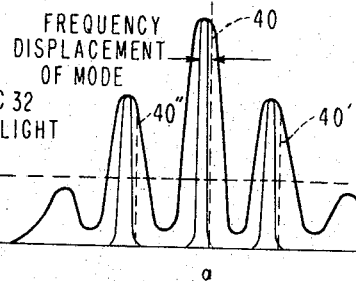
FIGURE 5A is an energy-frequency diagram of the maser indicated in FIGURE 5 and showing the frequency shift associated with the modulation.

The frequency change for the laser conditions and dimensions, previously indicated, is shown in FIGURE 5A by dotted lines 40, 40' and 40''. It should be noted that when the central frequency is shifted to the extreme position, the original frequency is zero in amplitude. Thus, no spurious signals are present to distort the carrier signal in which information is to be superimposed.

Information may be superimposed on the low carrier simply by applying the amplitude modulated signal source output directly to the piezoelectric crystal operated in a non-resonant mode. When the amplitude-modulated signal is applied to the piezoelectric crystal, it is believed apparent the mirror position will be controlled proportionately. The result is that the maximum displacement of the oscillating mirror will vary in accordance with the input signal. Correspondingly, the maximum frequency shift of the carrier frequency will be proportional to the amplitude-modulated input signal. The conversion of the amplitude-modulated signal to a frequency-modulated signal provides the advantages of no interference from spurious signals or modes developed in the laser cavity as in the case of externally amplitude-modulated laser.

A second embodiment for developing a laser output having a carrier of suitable frequency bandwidth is through mechanical resonance of a piezoelectric crystal. The mechanical resonance can be developed by a suitable oscillator supply. In the case of mechanical resonance, the amplitude of the mechanical oscillation will be translated into the carrier frequency of the laser. Amplitude modulating the oscillator signal with an information signal modulates the mechanical resonance of the mirror in accordance with the information signal. Accordingly, variations in the information signal will produce a corresponding frequency modulation in the output of the laser. Calculations indicate that a 1 kmc. bandwidth in the laser output will require a mirror displacement of the order of $3 \times 10^{-5}$ centimeters. The principal advantage of the resonating system is that the resonating effect of the piezoelectric crystal enables a lower driving voltage to produce the 1 kmc. bandwidth than when the piezoelectric crystal is operated in a non-resonating mode. The small displacement of the crystal could conceivably, however, result in crystal cracking or shattering. Suitable design of the crystal can be arranged to permit operation without cracking.

Still another embodiment for modulating an information signal is to maintain the external mirror in a fixed position and oscillate the laser crystal to establish a carrier frequency. The information signal is supplied to the external mirror or piezoelectric crystal in electrical form to modulate the laser cavity distance and provide a bandwidth similar to that indicated for the mechanically resonant system.

Figure 6:
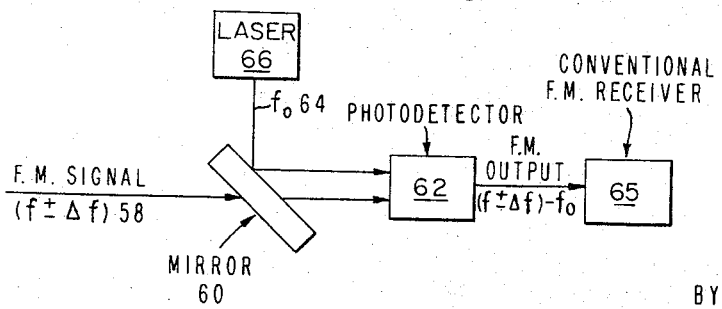
FIGURE 6 is a schematic diagram of a detector for translating the frequency-modulated output of FIGURE 5 into a corresponding frequency-modulated electrical signal.

Having developed a suitable laser output signal that is internally frequency modulated, the next step is to detect the information signal supplied to the carrier. Turning now to FIGURE 6, one arrangement for detecting the information signal comprises a mirror 60 for receiving the internally modulated frequency output ($f \pm \Delta f$) 58 of the laser and a photodetector 62 for converting the modulated signal into a corresponding electrical signal. The signal 58 received from the transmitting laser (not shown) is directed through the mirror 60 onto the photodetector 62. Also, applied to the mirror is a laser signal 64 at a frequency $f_0$ which is developed by a conventional laser 66. The laser 66 serves as a heterodyne oscillator to establish a reference frequency for operating the photodetector. The photodetector receives both the heterodyne signal and the frequency modulated signal and provides an electrical output that corresponds to the frequency-modulated signal without the heterodyne signal. The electrical frequency-modulated signal is thereafter applied to a conventional frequency modulating receiver 65. The operation of the photodetector is described in an article entitled "Signal to Noise Ratios in Photo Electric Mixing" by B. Oliver in a letter to the editor, Proceedings of the IRE, December 1961, page 1960. The operation of the FM receiver in response to an electrical signal is believed to be readily apparent to a worker skilled in the art.

Thus, the present invention has provided a relatively simple and versatile system for frequency modulating coherent radiation in the visible or infrared region of the electromagnetic wave spectrum. No complex lens system or other apparatus is required to obtain the frequency-modulated output of the laser. The high mode selection feature of the laser provides a strong carrier signal which can be transmitted over a comparatively long distance. The system can be constructed with components and elements presently available on the commercial market so that the simplicity, reliability and versatility of the present invention should make it of interest to the commercial, governmental and scientific communities.

While the invention has been particularly shown and described with reference to preferred embodiments thereof, it will be understood by those skilled in the art that various changes in form and details may be made therein without departing from the spirit and scope of the invention.

What is claimed is:

1. A laser for producing frequency-modulated coherent light in a given frequency range of the electromagnetic wave spectrum comprising
    an active element capable of producing coherent radiation by stimulated emission,
    means for producing emission from said active element,
    means for receiving the stimulated coherent radiation, said means returning a portion of the coherent radiation to the active element and transmitting a portion of the coherent radiation, said means, spaced from the active element, establishing coherent radiation in a susbtantially single frequency mode, and
    means for oscillating the returning and transmitting means to modulate the substantially single frequency mode within the element and develop a frequency shift of preselected bandwidth for communication purposes.

2. A laser for producing frequency-modulated coherent light in a given frequency range of the electromagnetic wave spectrum comprising an active element capable of producing coherent radiation by stimulated emission, said active element having a length L an "n" number of wavelengths and a central axis along which coherent radiation is emitted, a receiving and transmitting surface spaced from the element a distance $L_1$ and a "p" number of wavelengths, said surface being disposed along said axis and adapted to establish an optical resonating cavity, said optical resonating cavity cooperating with the active element to establish a substantially single frequency mode in the coherent radiation developed by the active element, and means for oscillating the receiving and transmitting surface to modulate internally the element thereby to produce a frequency shift in the substantially single frequency mode of the active element.

3. A laser for producing frequency-modulated coherent light in a given frequency range of the electromagnetic wave spectrum comprising an active element capable of producing coherent radiation by stimulated emission, said active element establishing a first optical resonating cavity length and having a central axis along which coherent radiation is emitted, a transmitting and receiving surface disposed along the central axis and arranged to establish a second optical resonating cavity length said surface reflecting substantially all coherent radiation, said first and second optical resonating cavity cooperating to establish within the active element a substantially single frequency mode in the stimulated coherent radiation developed by the active element, and means for oscillating the element about a fixed point on the said central axis, said element oscillation varying the total cavity length of the first and second optical cavities to develop within the active element a frequency shift in the substantially single frequency mode, said frequency shift being proportional to the change in the combined cavity length of the optical cavities.

4. A laser for producing frequency-modulated coherent light in a given frequency range of the electromagnetic wave spectrum comprising a solid active element capable of producing coherent radiation by stimulated emission, said active element having a length L, an "n" number of wavelength, and a central axis along which the stimulated emission is emitted, an electromechanical transducer spaced a distance one-half L from said element and a "p" number of wavelengths, said transducer disposed along said axis, said transducer adapted to receive and transmit a portion of the coherent radiation, said transducer further adapted to return substantially all the coherent radiation to the active element to develop a substantially single frequency mode within the active element, and means for energizing the electromechanical transducer to modulate internally the element and develop frequency shift of the order of 1 kmc. in the single frequency mode according to an input signal supplied to the transducer.

5. A laser for producing frequency-modulated coherent light in a given frequency range of the electromagnetic wave spectrum comprising an active element adapted to produce stimulated coherent radiation, said active element having a central axis along which the coherent radiation is emitted, said active element functioning as an optical resonating cavity having a first optical path length $L_1$, and developing an "n" number of coherent radiation wavelengths within the cavity, a Rochelle salt crystal disposed along the central axis and adapted to establish a second optical cavity of length $L_2$, said second optical cavity adapted to establish a "p" number of coherent radiation wavelengths in the second optical cavity, said salt crystal adapted to return a portion of the coherent radiation to the active element so that a central frequency mode is developed in the coherent radiation for the crystal position $(L_2/L_1)$ "n"="p," and means for energizing the salt crystal in a non-resonant mode so that a frequency shift is developed in the coherent radiation developed by the active element, said frequency shift being proportional to an input signal supplied to the salt crystal.

6. The laser defined in claim 4 further including an oscillator connected to the transducer, the input signal modulating the oscillator frequency.

7. A laser for producing frequency modulated coherent light in a given frequency range of the electromagnetic wave spectrum comprising (a) a solid active element capable of producing coherent radiation by stimulated emission, said active element having a length L and "n" number of wavelengths and a central axis along which the stimulated emission is emitted;

(b) a transducer spaced a distance one-half L from said element and a "p" number of wavelengths, said transducer adapted to receive and transmit a portion of the coherent radiation, said transducer further adapted to return a portion of the coherent radiation to the active element to develop a substantially single frequency mode within the element; and (c) a frequency source connected to the transducer, said source establishing resonance in the transducer and developing a frequency shift in the substantially single frequency mode according to an input signal modulating the frequency source.

References Cited

UNITED STATES PATENTS

| 2,206,169 | 7/1940 | Eisenbut et al. | 250—199 |
| 2,265,784 | 12/1941 | Von Baeyer | 250—199 |
| 3,134,837 | 5/1964 | Kisliuk et al. | 331—94.5 |
| 3,187,270 | 6/1965 | Kogelnik et al. | 331—94.5 |

FOREIGN PATENTS

| 608,711 | 3/1962 | Belgium. |
| 124,805 | 4/1919 | Great Britain. |

OTHER REFERENCES

Forrester: Journal Opt. Soc. Amer., vol. 51, No. 3, March 1961, pp. 253–259.

Vogel et al.: Electronics, vol. 34, Nov. 10, 1961, pp. 81–85.

Oliver: Proc. I.R.E., December 1961, pp. 1960–1961.

"Coherent Light Receiver . . .," Radio-Electronics, August 1962, pp. 6, 8.

JOHN W. CALDWELL, *Acting Primary Examiner.*

DAVID G. REDINBAUGH, *Examiner.*